US010019563B2

(12) United States Patent
Tsukamoto et al.

(10) Patent No.: US 10,019,563 B2
(45) Date of Patent: Jul. 10, 2018

(54) INFORMATION PROCESSING APPARATUS AND INFORMATION PROCESSING METHOD

(71) Applicant: SONY CORPORATION, Tokyo (JP)

(72) Inventors: Takeo Tsukamoto, Tokyo (JP); Shuichi Konami, Chiba (JP); Tomoyuki Ito, Kanagawa (JP); Takashi Abe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/529,744

(22) PCT Filed: Aug. 26, 2015

(86) PCT No.: PCT/JP2015/074080
§ 371 (c)(1),
(2) Date: May 25, 2017

(87) PCT Pub. No.: WO2016/088415
PCT Pub. Date: Jun. 9, 2016

(65) Prior Publication Data
US 2017/0308690 A1    Oct. 26, 2017

(30) Foreign Application Priority Data

Dec. 5, 2014  (JP) .................................. 2014-246521

(51) Int. Cl.
*G06F 21/32* (2013.01)
*G06K 9/00* (2006.01)
(Continued)

(52) U.S. Cl.
CPC .......... *G06F 21/32* (2013.01); *G06F 21/6245* (2013.01); *G06K 9/00597* (2013.01); *H04H 60/45* (2013.01); *G02B 2027/0178* (2013.01)

(58) Field of Classification Search
CPC .......... G06F 21/32; G06F 21/35; G06F 21/34; G06F 19/34; G06F 21/83; G06F 21/88; G06F 2203/0338; G06F 3/03547
(Continued)

(56) References Cited

U.S. PATENT DOCUMENTS 8,369,595 B1 * 2/2013 Derakhshani ........ G06K 9/0061
382/117
8,401,247 B2 * 3/2013 Su ............................ G06T 1/00
382/117
(Continued)

FOREIGN PATENT DOCUMENTS

CN              1437161 A      8/2003
CN          102037488 A      4/2011
(Continued)

OTHER PUBLICATIONS

International Search Report and Written Opinion of PCT Application No. PCT/JP2015/074080, dated Nov. 4, 2015, 02 pages of English Translation and 07 pages of ISRWO.

*Primary Examiner* — Mark Blouin
(74) *Attorney, Agent, or Firm* — Chip Law Group

(57) ABSTRACT

Provided is an information processing apparatus including: a biometric information authentication unit that authenticates biometric information identified from each of a plurality of captured images of an eye of a user of different sight line directions, on the basis of reference images of the eye of the user of the respective sight line directions; and an authentication result combining unit that combines authentication results by the biometric information authentication unit.

17 Claims, 17 Drawing Sheets

(51) Int. Cl.
*H04H 60/45* (2008.01)
*G06F 21/62* (2013.01)
*G02B 27/01* (2006.01)

(58) Field of Classification Search
USPC ........................................................ 340/5.83
See application file for complete search history.

(56) References Cited

U.S. PATENT DOCUMENTS

| | | | | |
|---|---|---|---|---|
| 8,520,903 | B2* | 8/2013 | Gupta | G06F 21/32 |
| | | | | 382/115 |
| 8,705,808 | B2* | 4/2014 | Determan | G06K 9/00604 |
| | | | | 382/115 |
| 8,928,558 | B2* | 1/2015 | Lewis | A61B 3/113 |
| | | | | 345/8 |
| 8,953,851 | B2* | 2/2015 | Inkumsah | G06F 21/32 |
| | | | | 382/117 |
| 9,020,207 | B2* | 4/2015 | Paul | G06F 21/32 |
| | | | | 382/115 |
| 9,078,600 | B2* | 7/2015 | Su | G06K 9/0061 |
| 9,600,069 | B2* | 3/2017 | Publicover | G06F 3/013 |
| 2003/0152252 | A1 | 8/2003 | Kondo et al. | |
| 2011/0033091 | A1 | 2/2011 | Fujii et al. | |
| 2014/0126782 | A1 | 5/2014 | Takai et al. | |

FOREIGN PATENT DOCUMENTS

| | | |
|---|---|---|
| CN | 103809743 A | 5/2014 |
| EP | 1335329 A2 | 8/2003 |
| GB | 2471045 A | 12/2010 |
| JP | 2005-004781 A | 1/2005 |
| JP | 2007-141002 A | 6/2007 |
| JP | 2007141002 A | 6/2007 |
| JP | 2009-251924 A | 10/2009 |
| JP | 2012-008746 A | 1/2012 |
| JP | 2014-092940 A | 5/2014 |
| KR | 10-2008-0019658 A | 3/2008 |
| KR | 10-2010-0122101 A | 11/2010 |
| WO | 2009/125689 A1 | 10/2009 |

* cited by examiner

FIG. 4

| USER ID | FEATURE VALUE OF EYE | | | AUTHENTICATION SCREEN ID | SIGHT LINE MOVEMENT PATTERN (1) MOVEMENT PATTERN | ... |
|---|---|---|---|---|---|---|
| | UPPER LEFT | UP | UPPER RIGHT | | | |
| 0001 | 11101001... | 01100110... | 10001101... | 1234 | UPPER LEFT, UP, UPPER RIGHT, RIGHT, LOWER RIGHT | ... |
| 0002 | 10111011... | 01010100... | 11011100... | 1234 | UPPER LEFT, LEFT, LOWER LEFT, DOWN, LOWER RIGHT | ... |
| ... | ... | ... | ... | ... | ... | ... |

FIG. 17

| AUTHENTICATION RESULT | PROVIDED FUNCTION |
|---|---|
| LOW | TERMINAL LOGIN UTILIZATION OF BASIC FUNCTION APPLICATION |
| MIDDLE | UTILIZATION OF PAYMENT FUNCTION APPLICATION |
| HIGH | TERMINAL IS UTILIZABLE AS INDIVIDUAL IDENTIFICATION INFORMATION |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2015/074080 filed on Aug. 26, 2015, which claims priority benefit of Japanese Patent Application No. JP 2014-246521 filed in the Japan Patent Office on Dec. 5, 2014. Each of the above-referenced applications is hereby incorporated herein by reference in its entirety.

TECHNICAL FIELD

The present disclosure relates to an information processing apparatus, an information processing method, and a program.

BACKGROUND ART

In the past, various types of authentication technology that uses biometric information of a user, such as iris authentication and fingerprint authentication for example, are proposed. For example, Patent Literature 1 discloses a technology that performs authentication of the user by comparing a feature analyzed from an image of an iris of the user and a feature of the iris of the user stored in a memory.

CITATION LIST

Patent Literature

Patent Literature 1: JP 2012-8746A

DISCLOSURE OF INVENTION

Technical Problem

However, accuracy of the authentication is low in the technology described in Patent Literature 1. For example, the above technology identifies the feature of the iris used in the authentication from a captured image. Hence, it is possible that the feature of the identified iris largely varies depending on image quality of the captured image for example.

Thus, the present disclosure proposes a new and improved information processing apparatus, an information processing method, and a program, which can improve accuracy of authentication based on biometric information of an eye.

Solution to Problem

According to the present disclosure, there is provided an information processing apparatus including: a biometric information authentication unit that authenticates biometric information identified from each of a plurality of captured images of an eye of a user of different sight line directions, on the basis of reference images of the eye of the user of the respective sight line directions; and an authentication result combining unit that combines authentication results by the biometric information authentication unit.

According to the present disclosure, there is provided an information processing method including: authenticating biometric information identified from each of a plurality of captured images of an eye of a user of different sight line directions, on the basis of reference images of the eye of the user of the respective sight line directions; and combining authentication results of the biometric information.

According to the present disclosure, there is provided a program for causing a computer to function as: a biometric information authentication unit that authenticates biometric information identified from each of a plurality of captured images of an eye of a user of different sight line directions, on the basis of reference images of the eye of the user of the respective sight line directions; and an authentication result combining unit that combines authentication results by the biometric information authentication unit.

Advantageous Effects of Invention

As described above, according to the present disclosure, the accuracy of the authentication based on the biometric information of the eye can be improved. Note that the effect described herein is not necessarily restrictive, but may be one of the effects described in the present disclosure.

BRIEF DESCRIPTION OF DRAWINGS

FIG. 4 is an explanatory diagram that illustrates an exemplary configuration of a user information DB 128 according to this embodiment.

FIG. 17 is a table illustrating an example of a provided function of each authentication result, by an exemplary variant of the present disclosure.

MODE(S) FOR CARRYING OUT THE INVENTION

Figure 1:
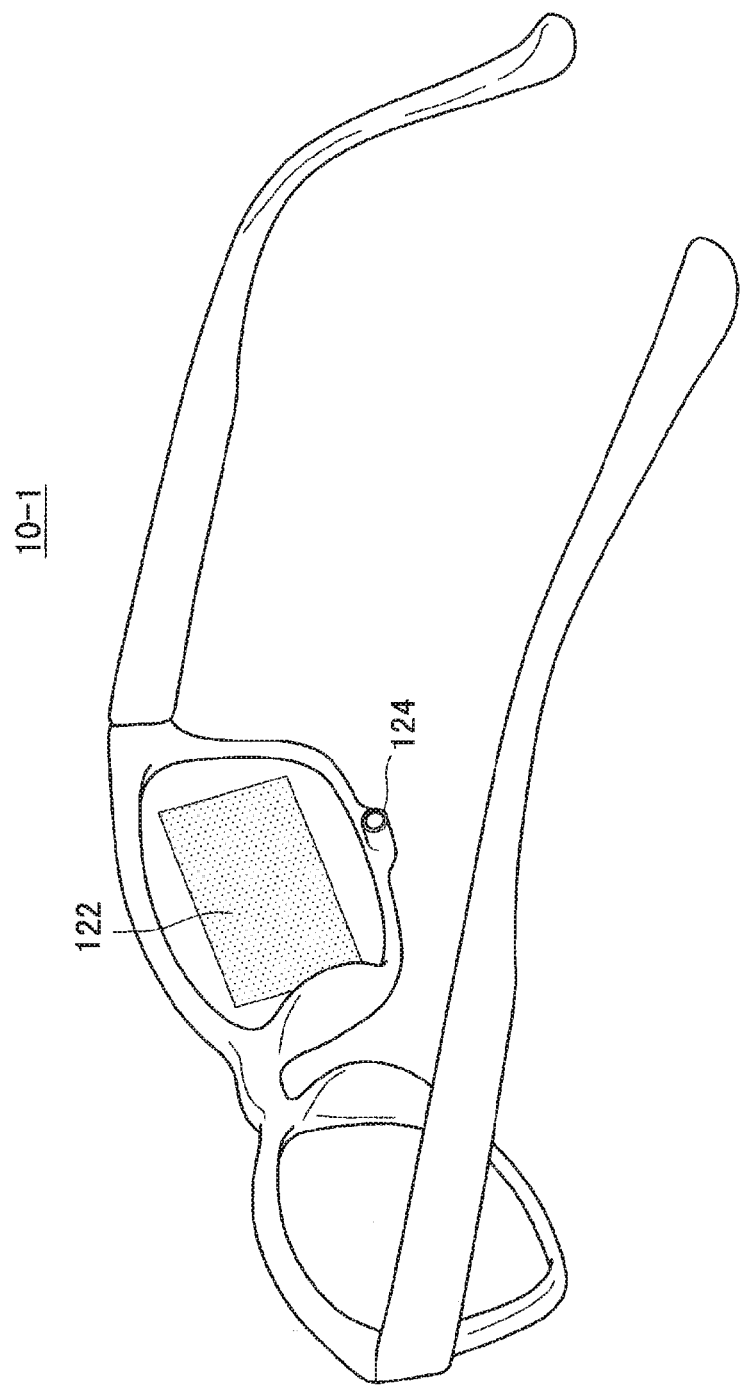
FIG. 1 is an exterior view of an information processing apparatus 10-1 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. For example, a plurality of elements that have the substantially same functional configuration are distinguished as necessary, like a captured image 20a of an eye and a captured image 20b of an eye. However, when there is no need in particular to distinguish structural elements that have substantially the same function and structure, the same reference sign alone is attached. For example, when the captured image 20a of the eye and the captured image 20b of the eye are needless to be distinguished particularly, the captured image 20a of the eye and the captured image 20b of the eye are simply referred to as a captured image 20 of an eye.

Also, the "Mode for Carrying Out the Invention" will be described in the order of items described below.
1. Basic Configuration of Information Processing Apparatus 10-1
1-1. Basic Configuration
1-2. Summarization of Problem
2. Detailed Description of Embodiment
2-1. Configuration
2-2. Operation
2-3. Effect
3. Hardware Configuration
4. Exemplary Variant

1. Basic Configuration of Information Processing Apparatus 10-1

<1-1. Basic Configuration>

The present disclosure can be carried out in various modes, as described in detail in "2. Detailed Description of Embodiment" as an example. First, a basic configuration of an information processing apparatus 10-1 according to the present embodiment will be described with reference to FIG. 1.

FIG. 1 is an explanatory diagram that illustrates an exterior appearance of the information processing apparatus 10-1. As illustrated in FIG. 1, the information processing apparatus 10-1 is an eyeglass device that a user can utilize by wearing on the head, for example. Also, the information processing apparatus 10-1 includes a display unit 122 that displays a display screen, and an imaging unit 124 that captures an image of an eye of the user.

As illustrated in FIG. 1, the display unit 122 is configured on a back surface part of a lens of the information processing apparatus 10-1, for example. Thereby, the user can visually confirm the display screen that is displayed on the display unit 122, while wearing the information processing apparatus 10-1 on the head. Also, the imaging unit 124 can capture the image of one eye of the user, while the user is wearing the information processing apparatus 10-1. Note that FIG. 1 illustrates an example in which the display unit 122 and the imaging unit 124 are provided in the lens of the right side in FIG. 1, but this example is not a limitation, and the display unit 122 and the imaging unit 124 may be provided in the lens of the left side.

Also, the information processing apparatus 10-1 can perform authentication of biometric information relevant to the eye on the basis of the image of the eye of the user which is captured by the imaging unit 124 for example. Here, the biometric information relevant to the eye is an image of an iris, an image of a blood vessel pattern of a sclera, an image of a retina, or the like, for example. Note that, in the following, an example in which the biometric information relevant to the eye is the image of the iris is described mainly.

<1-2. Summarization of Problem>

In the above, the basic configuration of the information processing apparatus 10-1 according to the present embodiment has been described. By the way, it is generally known that iris authentication has very high authentication accuracy, among biometric authentications that utilize a physical feature of a person.

A publicly known technology has disclosed a technology that performs authentication of a user by comparing a feature of an iris identified from a captured image and a feature of the iris of the user stored in a memory. However, in the above technology, the feature of the identified iris largely varies depending on the image quality of the captured image, and therefore the authentication accuracy is low. Note that, in the present specification, an expression "image quality of a captured image" means "quality of a captured image, suitable for iris authentication", unless described otherwise.

For example, the above technology largely reduces the authentication accuracy (i.e., the captured image does not have the quality suitable for the iris authentication) when the image quality of the captured image of the eye decreases due to motion blurring, focus, camera noise, size change of a pupil, or shielding of an iris part by reflection of an eyelid, an eyelash, and light, etc. As a result, a situation in which a correct person is not authenticated occurs.

Thus, in view of the above circumstances, the information processing apparatus 10-1 according to the present embodiment has been created. The information processing apparatus 10-1 according to the present embodiment can improve the authentication accuracy of the iris authentication. In the following, this present embodiment will be described in detail sequentially.

2. Detailed Description of Embodiment

<2-1. Configuration>

Figure 2:
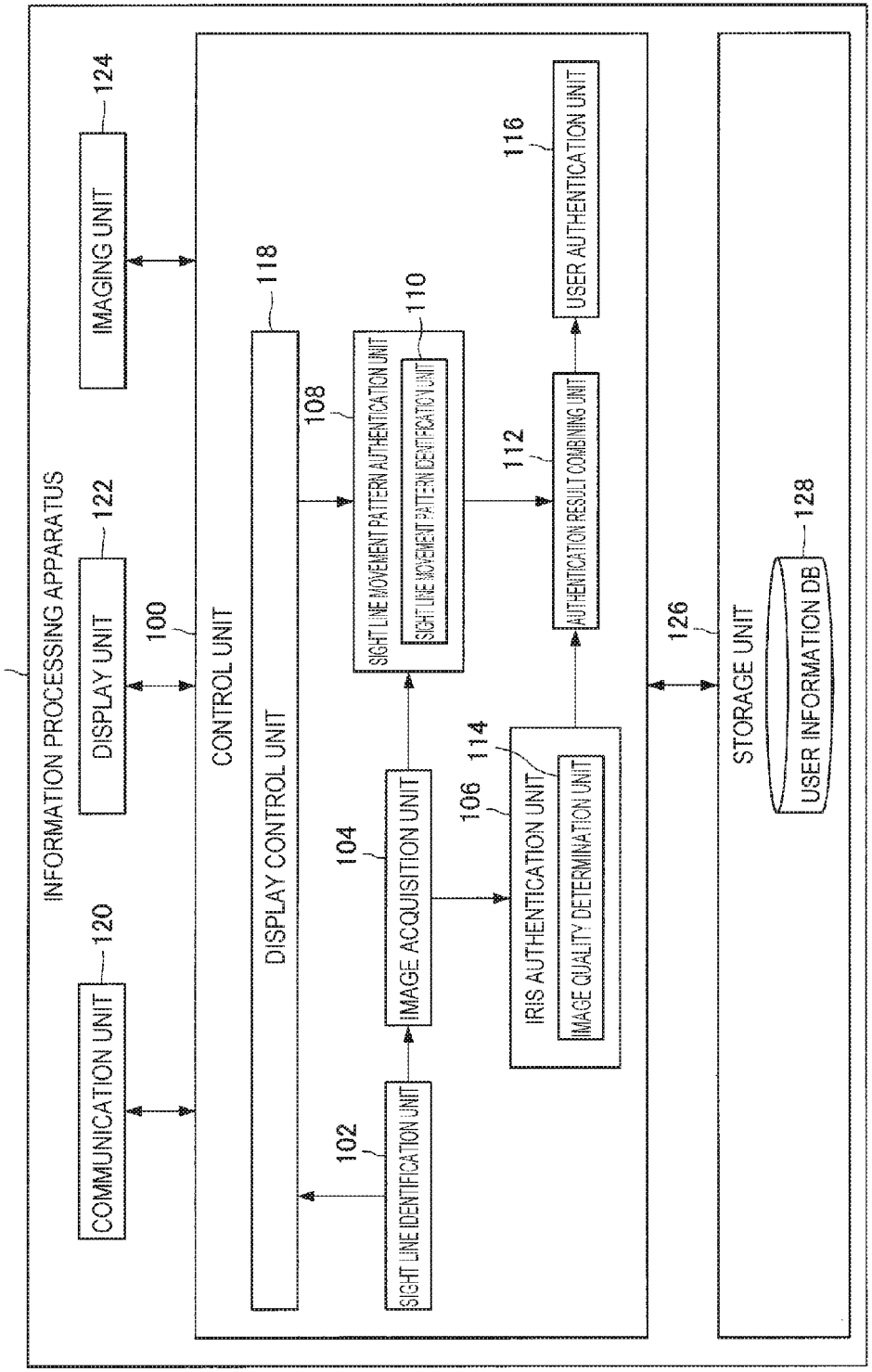
FIG. 2 is a functional block diagram that illustrates an exemplary configuration of an information processing apparatus 10-1 according to this embodiment.

First, a configuration according to the present embodiment will be described in detail. FIG. 2 is a functional block diagram that illustrates the configuration of the information processing apparatus 10-1 according to the present embodiment. As illustrated in FIG. 2, the information processing apparatus 10-1 includes a control unit 100, a communication unit 120, a display unit 122, an imaging unit 124, and a storage unit 126.

[2-1-1. Control Unit 100]

The control unit 100 controls the operation of the information processing apparatus 10-1 overall, by using hardware such as a later described central processing unit (CPU) 150 and a random access memory (RAM) 154 contained in the information processing apparatus 10-1. Also, as illustrated in FIG. 2, the control unit 100 includes a sight line identification unit 102, an image acquisition unit 104, an iris authentication unit 106, a sight line movement pattern authentication unit 108, an authentication result combining unit 112, a user authentication unit 116, and a display control unit 118. Also, the sight line movement pattern authentication unit 108 includes a sight line movement pattern identification unit 110. Also, the iris authentication unit 106 includes an image quality determination unit 114.

[2-1-2. Sight Line Identification Unit 102]

The sight line identification unit 102 identifies the sight line direction of the user in the captured image, on the basis of the captured image of the eye of the user which is captured by the imaging unit 124 described later, for example. More specifically, the sight line identification unit 102 identifies the sight line direction of the user, by performing pattern matching between the captured image of the captured eye and learning data of the captured image of the eye in each sight line direction, which is stored in the storage unit 126 for example.

Figure 3:
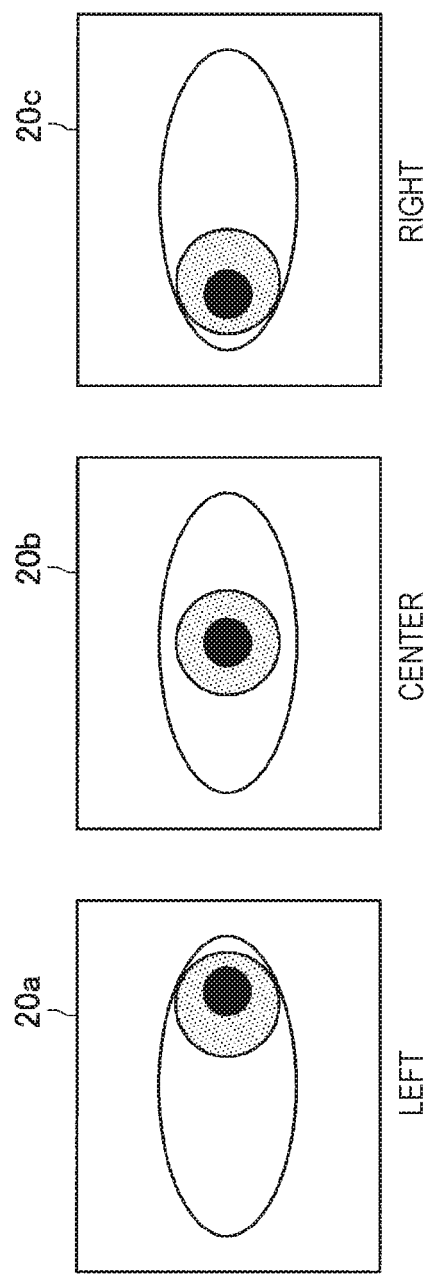
FIG. 3 is an explanatory diagram that illustrates an example of captured images of an eye according to this embodiment.

FIG. 3 is an explanatory diagram illustrating an example of captured images (captured images 20) of the eye captured by the imaging unit 124. As illustrated in FIG. 3, the sight line identification unit 102 identifies the sight line direction of the user in the captured image 20a as being "left", on the basis of the captured image 20a and the learning data. In the same way, the sight line identification unit 102 identifies the sight line direction of the user in the captured image 20b as being "center", and the sight line direction of the user in the captured image 20c as being "right", respectively.

[2-1-3. Image Acquisition Unit 104]

The image acquisition unit 104 acquires a plurality of captured images of an eye of the same user in different sight line directions, which are captured by the imaging unit 124 for example.

(2-1-3-1. Acquisition Example 1)

For example, when the sight line direction of an acquisition target is decided in advance, the image acquisition unit 104 determines whether or not the sight line direction identified by the sight line identification unit 102 from each of one or more captured images captured by the imaging unit 124 is the same as the sight line direction of the acquisition target, and acquires the captured image that is determined to be the same. Note that, each time the eye of the user is captured by the imaging unit 124, the image acquisition unit 104 can sequentially determine whether or not the sight line direction identified from the captured image by the sight line identification unit 102 is the same as the sight line direction of the acquisition target.

(2-1-3-2. Acquisition Example 2)

Alternatively, the image acquisition unit 104 can acquire the captured image of the eye of the user which is captured at a specific timing by the imaging unit 124. For example, the image acquisition unit 104 acquires the captured image of the eye of the user which is captured by the imaging unit 124 at a timing corresponding to the content displayed in the display screen.

Although the detail is described later, when the sight line identification unit 102 recognizes that the user has moved the sight line to a direction corresponding to a dot 320b or a dot 320d adjacent to a dot 320a that is in a selected state at the present moment in a pattern unlocking screen 32 illustrated in FIG. 7 for example, the image acquisition unit 104 acquires the captured image of the eye of the user which is captured by the imaging unit 124 during the recognition. Note that, in this case, the image acquisition unit 104 can acquire the captured image of the eye in association with a dot 320 (or the position of the dot 320) toward which the user directs the sight line.

Figure 9:
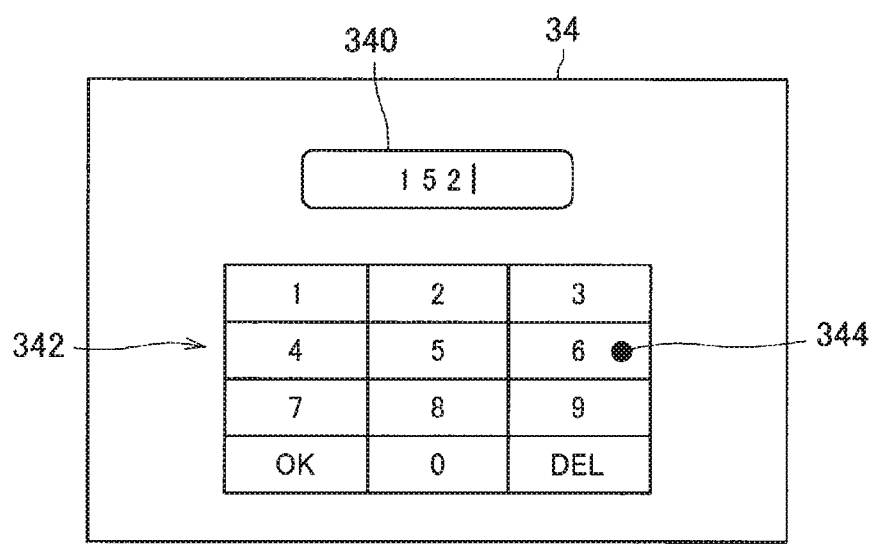
FIG. 9 is an explanatory diagram that illustrates an exemplary display of a PIN code input screen according to this embodiment.

Also, in a PIN code input screen 34 illustrated in FIG. 9, the image acquisition unit 104 acquires the captured image of the eye of the user which is captured by the imaging unit 124, while the next code is waited to be input and the sight line identification unit 102 recognizes that the user gazes an inside region of one of codes (for example, "1") by the sight line identification unit 102. Note that, in this case, the image acquisition unit 104 can acquire the captured image of the eye in association with the code that is recognized to be gazed by the user.

[2-1-4. Iris Authentication Unit 106]

The iris authentication unit 106 is an example of a biometric information authentication unit in the present disclosure. The iris authentication unit 106 performs iris authentication on the basis of the feature value identified from each of a plurality of captured images of the eye of different sight line directions which are acquired by the image acquisition unit 104, and the feature value of the eye of the user in each sight line direction which is recorded in a later described user information DB 128.

For example, the iris authentication unit 106 first acquires the feature value of the eye of the user which is recorded in the user information DB 128 in association with the user. Then, the iris authentication unit 106 performs the authentication by comparing the feature value identified from each of a plurality of captured images of the eye acquired by the image acquisition unit 104, with the feature value of the same sight line direction as the captured image of the eye among the feature values of the eye acquired from the user information DB 128.

More specifically, the iris authentication unit 106 first converts each of a plurality of captured images of the eye which are acquired by the image acquisition unit 104, to a bit sequence (hereinafter, referred to as a first bit sequence) by a predetermined method. Next, the iris authentication unit 106 acquires a bit sequence (hereinafter, referred to as a second bit sequence) of the same sight line direction as the captured image of the eye, among the bit sequences recorded as the feature value of the eye in the user information DB 128. Next, the iris authentication unit 106 compares the first bit sequence and the second bit sequence, and calculates a Hamming distance. Then, the iris authentication unit 106 normalizes the calculated Hamming distance so as to convert the calculated Hamming distance to a value within a range [0, 1] for example, and sets the normalized value as the authentication result. Note that, for example, the degree of identicalness is highest when the authentication result is "0", and the degree of identicalness is lowest when the authentication result is "1".

(2-1-4-1. Exemplary Variant)

Although the detail is described later, when combining a plurality of authentication results by the iris authentication unit 106, the later described authentication result combining unit 112 can exclude the authentication result of the iris authentication for the captured image that is determined to have low image quality by the later described image quality determination unit 114, from the target of the above combining. Hence, as an exemplary variant, the iris authentication unit 106 may skip a part of processes, such as the extraction of the feature value and the comparison of the bit sequences for example, with regard to the captured image of the eye that is determined to have the low image quality by the image quality determination unit 114.

(2-1-4-2. User Information DB 128)

A user information DB 128 is a database that records feature values of eyes which are registered in association with users, and patterns (hereinafter, referred to as sight line movement pattern) of movement of the sight line direction which are registered in association with the users and authentication screens. Here, an exemplary configuration of the user information DB 128 will be described with reference to FIG. 4.

As illustrated in FIG. 4, in the user information DB 128, user ID 1280, feature value 1282 of eye, and a plurality of sight line movement patterns 1290 are recorded in association with each other, for example. Also, each of the plurality of sight line movement patterns 1290 includes an authentication screen ID 1292 and a movement pattern 1294.

Here, in the user ID 1280, user IDs that are issued in advance for respective users are recorded. Also, in the feature value 1282 of the eye, feature values of the eyes, such as bit sequences for example, which are identified from the captured images of the eye of the user of the relevant user ID which are captured in advance in association with a plurality of sight line directions are recorded. Note that a plurality of sight line directions are 9 directions including upper left, up, upper right, left, center, right, lower left, down, and lower right, for example.

Also, in the authentication screen ID 1292, authentication screen IDs that are registered in advance for respective authentication screens are recorded. Also, in the movement pattern 1294, sight line movement patterns that are registered in advance in association with the authentication screen of the relevant authentication screen ID by the user of the relevant user ID are recorded.

[2-1-5. Sight Line Movement Pattern Identification Unit 110]

The sight line movement pattern identification unit 110 identifies the sight line movement pattern of the user, on the basis of the sight line direction identified by the sight line identification unit 102, relevant to each of a plurality of captured images of the eye which are acquired by the image acquisition unit 104. More specifically, the sight line movement pattern identification unit 110 can identify the sequence, along the image capturing order, of the sight line direction that is identified with regard to each of the plurality of acquired captured images of the eye, as the sight line movement pattern of the user.

(2-1-5-1. Identification Example 1)

Figure 5:
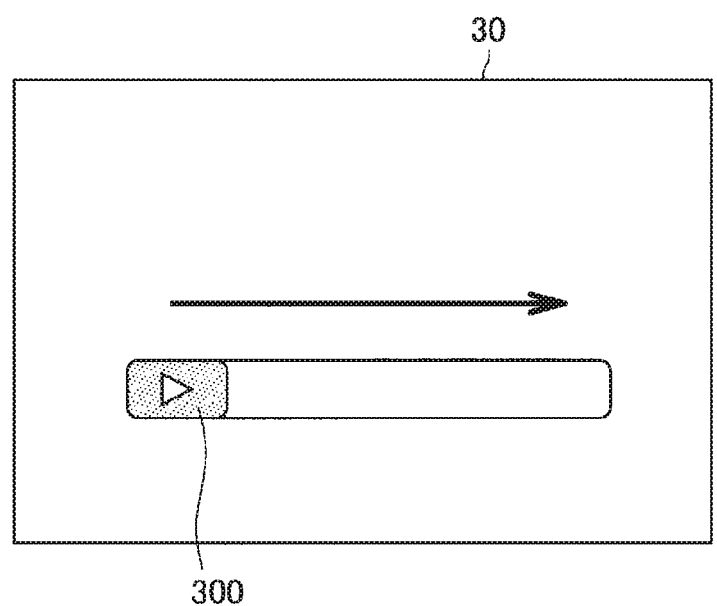
FIG. 5 is an explanatory diagram that illustrates an exemplary display of a slide unlocking screen according to this embodiment.

Here, the above function will be described in more detail with reference to FIGS. 5 to 10. FIG. 5 is an explanatory diagram illustrating an example of the authentication screen (slide lock screen 30) displayed on the display unit 122 by the display control unit 118.

The slide lock screen 30 is an authentication screen for unlocking a locked state of the screen, by moving a slide bar 300 from left to right, as illustrated with an arrow in FIG. 5 for example. This slide lock screen 30 is configured in such a manner that the slide bar 300 moves in accordance with change in the sight line direction that is detected in real time by the sight line identification unit 102 on the basis of the captured image captured by the imaging unit 124, for example.

Figure 6:
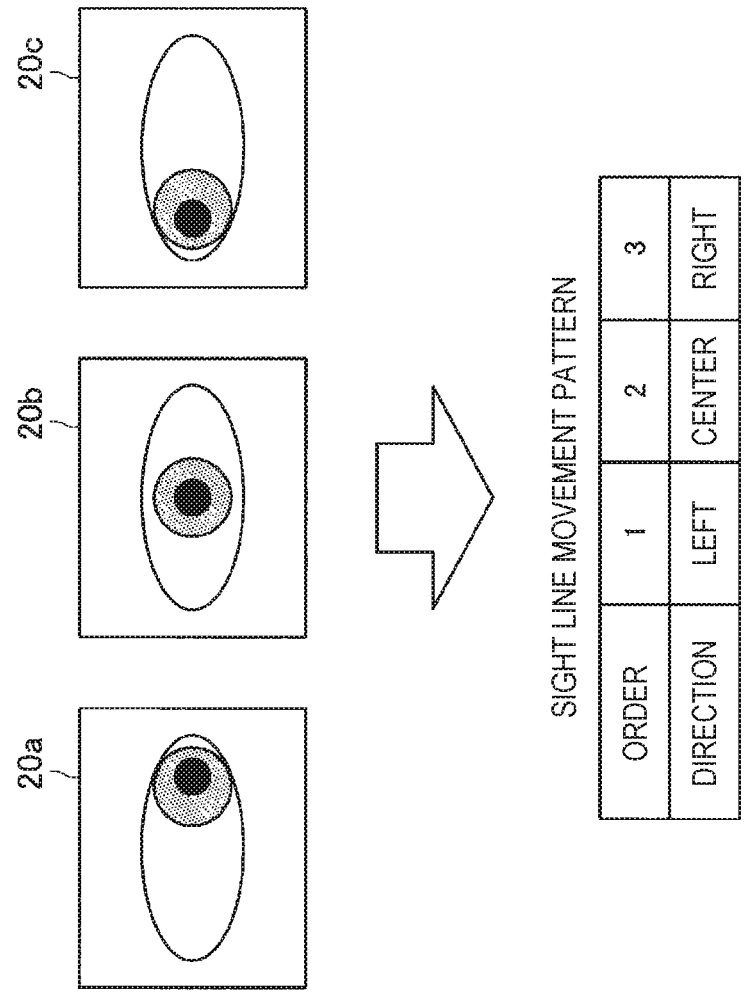
FIG. 6 is an explanatory diagram illustrating an identification example of a sight line movement pattern according to this embodiment.

FIG. 6 illustrates an example of a plurality of captured images 20 of the eye which are acquired by the image acquisition unit 104 when the slide lock screen 30 is displayed. Here, as illustrated in the upper diagram of FIG. 6, in the slide lock screen 30, three captured images are assumed to be acquired by the image acquisition unit 104 as the sight line of the user changes, for example in the order of the captured image 20a of the eye whose sight line direction is left, the captured image 20b of the eye whose sight line direction is center, and the captured image 20c of the eye whose sight line direction is right.

In this case, the sight line movement pattern identification unit 110 identifies the sight line movement pattern as being "left, center, right" by sequencing the sight line directions corresponding respectively to the captured image 20a of the eye to the captured image 20c of the eye, along the image capturing order, as illustrated in the lower diagram of FIG. 6.

(2-1-5-2. Identification Example 2)

Next, another identification example of the sight line movement pattern will be described with reference to FIGS. 7 and 8. FIG. 7 is an explanatory diagram illustrating another example of the authentication screen (pattern unlocking screen 32) displayed on the display unit 122.

Figure 7:
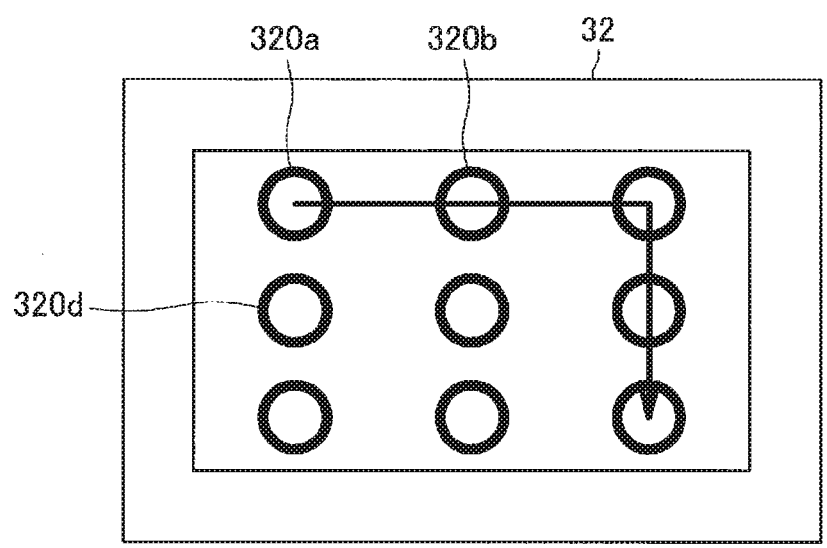
FIG. 7 is an explanatory diagram that illustrates an exemplary display of a pattern unlocking screen according to this embodiment.

The pattern unlocking screen 32 is a screen in which a plurality of dots 320 are located, and is a screen for authenticating the user by the user who selects the individual dots 320 in the order registered by the user in advance, as illustrated with an arrow in FIG. 7 for example. In this pattern unlocking screen 32, when the sight line identification unit 102 recognizes that the user has moved the sight line to the direction corresponding to any one of a plurality of dots 320 (the dot 320b or the dot 320d in the example illustrated in FIG. 7) adjacent to the dot 320a that is in a selected state at the present moment, the selected state shifts to the dot 320 to which the user directs the sight line.

Figure 8:
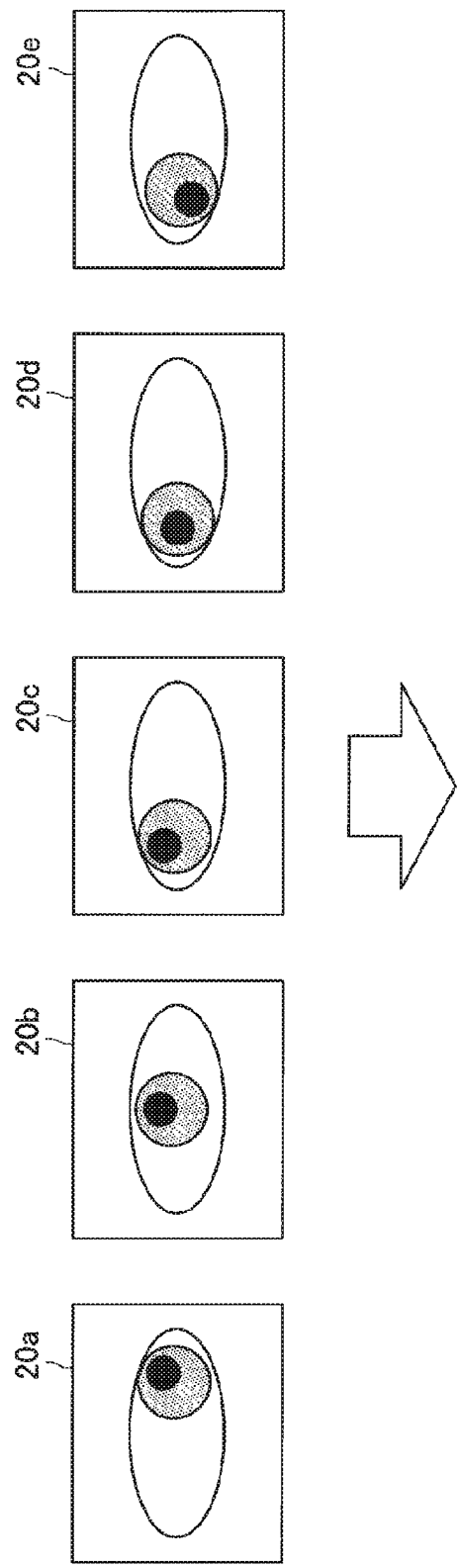
FIG. 8 is an explanatory diagram illustrating an identification example of a sight line movement pattern according to this embodiment.

FIG. 8 illustrates an example of a plurality of captured images 20 of the eye that are acquired by the image acquisition unit 104 when the pattern unlocking screen 32 is displayed. Here, as illustrated in the upper diagram of FIG. 8, in the pattern unlocking screen 32, five captured images are assumed to be acquired by the image acquisition unit 104 as the sight line of the user changes, for example in the order of the captured image 20a of the eye, the captured image 20b of the eye, the captured image 20c of the eye, the captured image 20d of the eye, and the captured image 20e of the eye.

In this case, the sight line movement pattern identification unit 110 identifies the sight line movement pattern as being "upper left, up, upper right, right, lower right" by sequencing the sight line directions corresponding respectively to the captured image 20a of the eye to the captured image 20e of the eye, along the image capturing order, as illustrated in the lower diagram of FIG. 8.

(2-1-5-3. Identification Example 3)

Next, another identification example of the sight line movement pattern will be described with reference to FIGS. 9 and 10. FIG. 9 is an explanatory diagram illustrating another example of the authentication screen (PIN code input screen 34) displayed on the display unit 122.

As illustrated in FIG. 9, the PIN code input screen 34 includes an input code display field 340 and a code selection display 342, for example. This PIN code input screen 34 is a screen for authenticating the user, by causing the user to input a 4-digit PIN code that has been registered by the user in advance, for example. Also, the PIN code input screen 34 is configured to accept an input of the code corresponding to a viewing position 344 sequentially, each time the viewing position 344 of the user is detected by the sight line identification unit 102. For example, in the example illustrated in FIG. 9, the viewing position 344 is positioned in the region of "6" in the code selection display 342, and thus the information processing apparatus 10-1 recognizes that the code input by the user at the present moment is "6".

Figure 10:
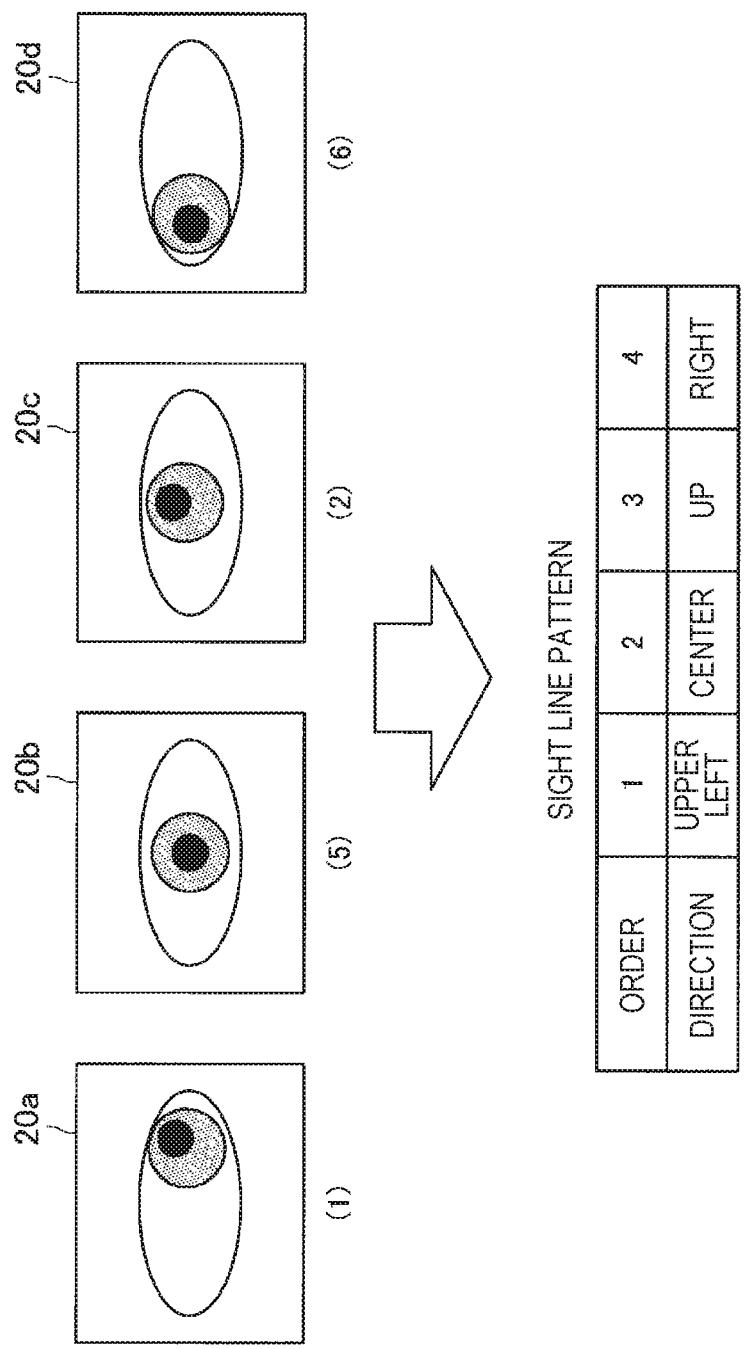
FIG. 10 is an explanatory diagram illustrating an identification example of a sight line movement pattern according to this embodiment.

FIG. 10 illustrates an example of a plurality of captured images 20 of the eye which are acquired by the image acquisition unit 104 when the PIN code input screen 34 is displayed. Here, as illustrated in the upper diagram of FIG. 10, in the PIN code input screen 34, four captured images are assumed to be acquired by the image acquisition unit 104 as the sight line of the user changes, in the order of the captured image 20a of the eye acquired in association with the code "1", the captured image 20b of the eye acquired in association with the code "5", the captured image 20c of the eye acquired in association with the code "2", and the captured image 20d of the eye acquired in association with the code "6", for example.

In this case, the sight line movement pattern identification unit 110 identifies the sight line movement pattern as being "upper left, center, up, right" by sequencing the sight line directions corresponding respectively to the captured image 20a of the eye to the captured image 20d of the eye along the image capturing order, as illustrated in the lower diagram of FIG. 10.

[2-1-6. Sight Line Movement Pattern Authentication Unit 108]

The sight line movement pattern authentication unit 108 authenticates validity of the identified sight line movement pattern, by comparing the sight line movement pattern recorded in the user information DB 128 in association with the displayed authentication screen and the user and the sight line movement pattern identified by the sight line movement pattern identification unit 110.

For example, the sight line movement pattern authentication unit 108 determines that the identified sight line movement pattern is valid, when the sight line movement pattern recorded in the user information DB 128 is completely identical with the sight line movement pattern identified by the sight line movement pattern identification unit 110. Also, the sight line movement pattern authentication unit 108 determines that the identified sight line movement pattern is not valid, when the image capturing directions in the image capturing order included in the sight line movement pattern recorded in the user information DB 128 are not identical with the image capturing directions in the image capturing order included in the sight line movement pattern identified by the sight line movement pattern identification unit 110 at least partially.

Here, the above function will be described in detail with reference to FIGS. 4 and 7. For example, the authentication screen ID of the pattern unlocking screen 32 illustrated in FIG. 7 is assumed to be "1234", and the user ID of the user is assumed to be "0001". In this case, in the user information DB 128 illustrated in FIG. 4, the sight line movement pattern registered in association with the relevant user and the pattern unlocking screen 32 is "upper left, up, upper right, right, lower right". Here, it is assumed that the pattern illustrated in the arrow in FIG. 7 (that is, "upper left, up, upper right, right, lower right") is identified as the sight line movement pattern by the sight line movement pattern identification unit 110. In this case, the identified sight line movement pattern is completely identical with the sight line movement pattern recorded in the user information DB 128, and thus the sight line movement pattern authentication unit 108 determines that the identified sight line movement pattern is valid.

[2-1-7. Image Quality Determination Unit 114]

The image quality determination unit 114 determines the image quality of the imaged region of the eye with regard to each of a plurality of captured images of the eye which are acquired by the image acquisition unit 104.

(2-1-7-1. Determination Example 1)

For example, the image quality determination unit 114 determines the image quality of the captured image on the basis of whether or not the iris imaged region overlaps the outside light region, with regard to each of the plurality of acquired captured images of the eye. Here, the outside light region is a region of flare, ghost, illumination light, reflected light, or the like which is included in the captured image, for example. Note that the illumination light is light of a fluorescent lamp in a room, sun light, or the like, for example. Also, the reflected light is the light generated by the illumination light reflecting on an object, for example.

Figure 11:
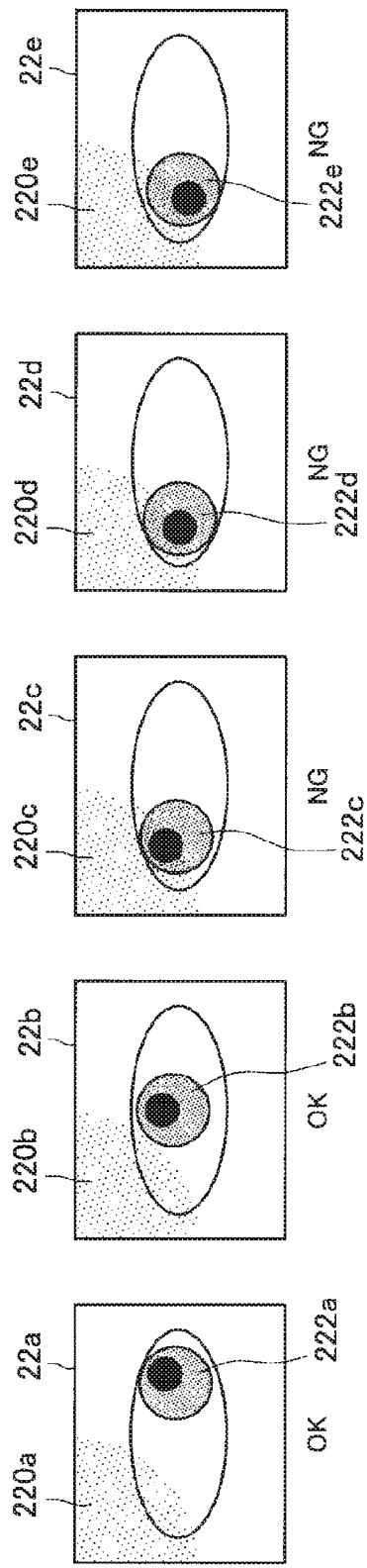
FIG. 11 is an explanatory diagram illustrating a determination example of image quality of a captured image of an eye according to this embodiment.

Here, the function of the above image quality determination unit 114 will be described in more detail with reference to FIG. 11. FIG. 11 is an explanatory diagram illustrating a determination example of a plurality of captured images (captured images 22) of the eye by the image quality determination unit 114. Note that the captured images 22 are an example of the captured images in which flare has occurred, and includes a flare region 220.

As illustrated in FIG. 11, in the captured image 22a and the captured image 22b, an iris imaged region 222 does not overlap the flare region 220. Hence, the image quality determination unit 114 determines that the image qualities of the captured image 22a and the captured image 22b are high. On the other hand, the iris imaged region 222 overlaps the flare region 220 in all of the captured image 22c to the captured image 22e. Hence, the image quality determination unit 114 determines that the image qualities of the captured image 22c to the captured image 22e are low.

Note that, usually, the outside light region has a very high brightness value as compared with the iris imaged region (more specifically, pupil and iris imaged region). Hence, the image quality determination unit 114 can determine that the iris imaged region overlaps the outside light region, when the iris imaged region has a higher brightness value than a threshold value.

(2-1-7-2. Determination Example 2)

Also, the image quality determination unit 114 determines the image quality of the captured image on the basis of whether or not the eye is closed, with regard to each of the plurality of acquired captured images of the eye. Here, the case of the closed eye includes a case of closing the eye with a blink or the like, closing the eye half, or the like, for example.

More specifically, the image quality determination unit 114 can determine the image quality of the captured image on the basis of whether or not the size of the region that has a brightness value corresponding to the pupil is smaller than a threshold value, with regard to each of the plurality of acquired captured images of the eye. For example, the image quality determination unit 114 determines that the image quality of the captured image is low when the size of the region that has the brightness value corresponding to the pupil is smaller than the threshold value, with regard to each of the plurality of acquired captured images of the eye.

(2-1-7-3. Determination Example 3)

Also, the image quality determination unit 114 determines the image quality of the captured image on the basis of whether or not the iris imaged region is positioned in the region of a large lens distortion, with regard to each of the plurality of acquired captured images of the eye. Note that the lens distortion can be usually identified in advance as the characteristics of a camera module at the time of designing a camera 162 described later. Hence, the image quality determination unit 114 can determine the image quality of the captured image on the basis of whether or not the iris imaged region is positioned in the region of the large lens distortion which is identified in advance, with regard to each of the plurality of acquired captured images of the eye.

For example, the image quality determination unit 114 determines that the image quality of the captured image is low when the iris imaged region is positioned in the region of the large lens distortion, with regard to each of the plurality of acquired captured images of the eye.

(2-1-7-4. Determination Example 4)

Also, the image quality determination unit 114 determines the image quality of the captured image on the basis of whether or not a defective pixel identified in advance overlaps the iris imaged region, with regard to each of the plurality of acquired captured images of the eye. Here, the defective pixel is a pixel corresponding to a region where dust and dirt get into the image sensor of the camera 162, for example.

For example, the image quality determination unit 114 determines that the image quality of the captured image is low when the defective pixel overlaps the iris imaged region, with regard to each of the plurality of acquired captured images of the eye.

[2-1-8. Authentication Result Combining Unit 112]

(2-1-8-1. Combination Example 1)

The authentication result combining unit 112 combines the authentication result by the iris authentication unit 106 to each of the plurality of captured images of the eye which are acquired by the image acquisition unit 104 and the authentication result of the sight line movement pattern by the sight line movement pattern authentication unit 108. For example, the authentication result combining unit 112 combines, by linear combination, each of the authentication results by the iris authentication unit 106, and the authentication result of the sight line movement pattern by the sight line movement pattern authentication unit 108, as in the following equation (1).

[Math. 1]

$$\text{Score}_k = \alpha \times \frac{\sum_{i=1}^{m}(1 - \text{EyeScore}_{i,k})}{m} + \beta \times (1 - \text{GazeScore}_k) \quad \text{Equation (1)}$$

Here, i is the number indicating the image capturing order of each captured image for example; m is the number of captured images acquired by the image acquisition unit 104 (at the time of a series of iris authentication); and k is the user ID. Also, Score(k) is the value of the authentication result combined by the authentication result combining unit 112, relevant to the user whose user ID is k. Also, EyeScore (i, k) is the value of the result of the iris authentication relevant to the i-th captured image, of the user whose user ID is k. Also, GazeScore(k) is the value of the authentication result by the sight line movement pattern authentication unit 108, of the user whose user ID is k. For example, in GazeScore(k), 0 is set when the sight line movement pattern is authenticated by the sight line movement pattern authentication unit 108, and 1 is set when the sight line movement pattern is not authenticated.

Also, $\alpha$ and $\beta$ are predetermined coefficients indicating the proportion of combination between the authentication result by the iris authentication unit 106 and the authentication result by the sight line movement pattern authentication unit 108. For example, $\alpha$ and $\beta$ are set to establish $\alpha+\beta=1.0$. Note that $\alpha$ and $\beta$ may be set to arbitrary values by a system designer. Alternatively, $\alpha$ and $\beta$ may be set to the values according to the upper limit value of a false acceptance rate (i.e., probability of incorrectly recognizing a wrong person as a correct person) that is specified by the system designer, for example.

(2-1-8-2. Combination Example 2)

Alternatively, the authentication result combining unit 112 can further combine each of the authentication results by the iris authentication unit 106, and the authentication result of the sight line movement pattern by the sight line movement pattern authentication unit 108, on the basis of the determination result of the image quality by the image quality determination unit 114. For example, the authentication result combining unit 112 combines, by linear combination, the authentication result excluding the authentication result of the iris authentication to the captured image that is determined to have a low image quality by the image quality determination unit 114, among a plurality of authentication results by the iris authentication unit 106, and the authentication result of the sight line movement pattern by the sight line movement pattern authentication unit 108, as in the following equation (2).

[Math. 2]

$$\text{Score}_k = \alpha \times \frac{\sum_{i=1}^{m} \gamma_i \times (1 - \text{EyeScore}_{i,k})}{\sum_{i=1}^{m} \gamma_i} + \beta \times (1 - \text{GazeScore}_k) \quad \text{Equation (2)}$$

[Math. 3]

$$\text{Score}_k = \beta \times (1 - \text{GazeScore}_k) \left( \text{when} \sum_{i=1}^{m} \gamma_i = 0 \right) \quad \text{Equation (2')}$$

Here, $\gamma(i)$ is a weight coefficient of the result of the iris authentication relevant to the i-th captured image. The authentication result combining unit 112 basically sets $\gamma(i)=1$ when using the result of the iris authentication relevant to the i-th captured image, and sets $\gamma(i)=0$ when not using the result of the iris authentication relevant to the i-th captured image. For example, the authentication result combining unit 112 sets $\gamma(i)=1$ when the image quality of the i-th captured image is determined to be high by the image quality determination unit 114, and sets $\gamma(i)=0$ when the image quality of the captured image is determined to be low. As an example, in the example illustrated in FIG. 11, the image qualities of the captured image 22c to the captured image 22e are determined to be low by the image quality determination unit 114. Hence, the authentication result combining unit 112 sets $\gamma(i)=0$, with regard to i=3 to 5 corresponding to the captured image 22c to the captured image 22e.

Note that the authentication result combining unit 112 may set all $\gamma(i)$ to 0, when the image quality of the iris imaged region is low, due to the overlap of the iris imaged region and the flare region in all the captured images, for example. In this case, the value of the authentication result after the combination is decided, depending on only the authentication result of the sight line movement pattern.

Note that the content of other variables is the same as the above.

Here, as an example, an example ("case 1" to "case 3") in which the authentication result combining unit 112 uses the above equation (2) to combine each of the authentication results by the iris authentication unit 106 and the authentication result of the sight line movement pattern by the sight line movement pattern authentication unit 108 in the pattern unlocking screen 32 illustrated in FIG. 7 will be described.

Note that, here, $\alpha=0.8$ and $\beta=0.2$ are assumed to be set. Also, it is assumed that the iris authentication unit 106 has calculated that each of EyeScore(i, k) relevant to the captured images of i=1 to 5 is "0.1", "0.08", "0.1", "0.09", and "0.1". Also, it is assumed that the sight line movement pattern authentication unit 108 has calculated GazeScore(k)=0.

Case 1

For example, as case 1, a case in which the image quality determination unit 114 determines that the image qualities of all the captured images are high will be considered. In this case, the authentication result combining unit 112 calculates Score(k)=0.9248, by using the result of the iris authentication relevant to all of the 5 captured images, that is, by setting all $\gamma(i)=1$ in the above equation (2).

Case 2

Also, as case 2, a case in which the image quality determination unit 114 determines that the image quality of the first captured image is low and calculates EyeScore(1, k)=0.99 will be considered. In this case, if the result of the iris authentication relevant to all of the 5 captured images is used, like the case 1, Score(k)=0.7824 is calculated, and the authentication result becomes lower than the case 1. Thus, Score(k)=0.926 is calculated by not using the result of the iris authentication relevant to the first captured image (that is, by setting $\gamma(i)=0$ only with regard to i=1), and degradation of the authentication result can be prevented.

Case 3

Also, as case 3, a case in which the image quality determination unit 114 determines that the image qualities of all the captured images are low and calculates EyeScore(i, k)=0.99 with regard to i=1 to 5 will be considered. In this case, if the result of the iris authentication relevant to all of the 5 captured images is used, like the case 1, Score(k)=0.2080 is calculated, and the authentication result becomes lower than the case 1 significantly. Thus, Score(k)=0.2000 is calculated by not using the result of the iris authentication relevant to all of the 5 captured images (that is, by setting $\gamma(i)=0$ with regard to i=1 to 5).

As described above, in the case 3, even if all results of the iris authentication are used, Score(k) does not change substantially, and thus the authentication result combining unit 112 does not combine all the results of the iris authentication. An effect of this is reduction of the processing load of the authentication result combining unit 112. Note that, as described above, the iris authentication unit 106 can skip a part of the processes, with regard to the captured image whose image quality is determined to be low by the image quality determination unit 114. Hence, in the case 3, the processing load of the iris authentication unit 106 can also be reduced.

[2-1-9. User Authentication Unit 116]

The user authentication unit 116 authenticates the user, by comparing the value of the result combined by the authentication result combining unit 112 with a predetermined threshold value. More specifically, when the combined value is equal to or larger than the predetermined threshold value, the user authentication unit 116 authenticates the user. Also, when the combined value is smaller than the predetermined threshold value, the user authentication unit 116 does not authenticate the user.

[2-1-10. Display Control Unit 118]

The display control unit 118 causes the display unit 122 to display various types of display screens. For example, when the user ID is received from another device (depiction is omitted), the display control unit 118 causes the display unit 122 to display the authentication screen for authenticating the user of the received user ID, like the PIN code input screen 34 illustrated in FIG. 9 for example.

[2-1-11. Communication Unit 120]

The communication unit 120 is an example of an acquisition unit in the present disclosure. The communication unit 120 performs transmission and reception of information with another device capable of communicating with the information processing apparatus 10-1, by wireless communication for example. For example, the communication unit 120 receives the user ID from another device.

[2-1-12. Display Unit 122]

The display unit 122 displays various types of display screens, by the control of the display control unit 118.

[2-1-13. Imaging Unit 124]

The imaging unit 124 captures an image of the eye of the user, by the control of the image acquisition unit 104, for example. Note that the imaging unit 124 can also automatically capture images at predetermined intervals, for example.

[2-1-14. Storage Unit 126]

The storage unit 126 can store various types of data in the user information DB 128 or the like and software, for example.

Note that the configuration of the information processing apparatus 10-1 according to the present embodiment is not limited to the above configuration. For example, the user information DB 128 can be stored in another device capable of communicating with the information processing apparatus 10-1, instead of being stored in the storage unit 126. Also, the information processing apparatus 10-1 may further include the input unit for the user to input various types of information, such as the user ID, to the information processing apparatus 10-1, for example. Note that the input unit may be able to accept an input by the sight line, that is, an input based on the sight line direction identified by the sight line identification unit 102, for example.

<2-2. Operation>

[2-2-1. Entire Operation]

In the above, the configuration according to the present embodiment has been described. Next, the operation according to the present embodiment will be described with reference to FIGS. 12 to 14. Note that, here, an exemplary operation in a situation in which the user is authenticated on the basis of the captured image of the eye of the user and the change in the sight line direction when the authentication screen is displayed on the display unit 122 will be described.

Figure 12:
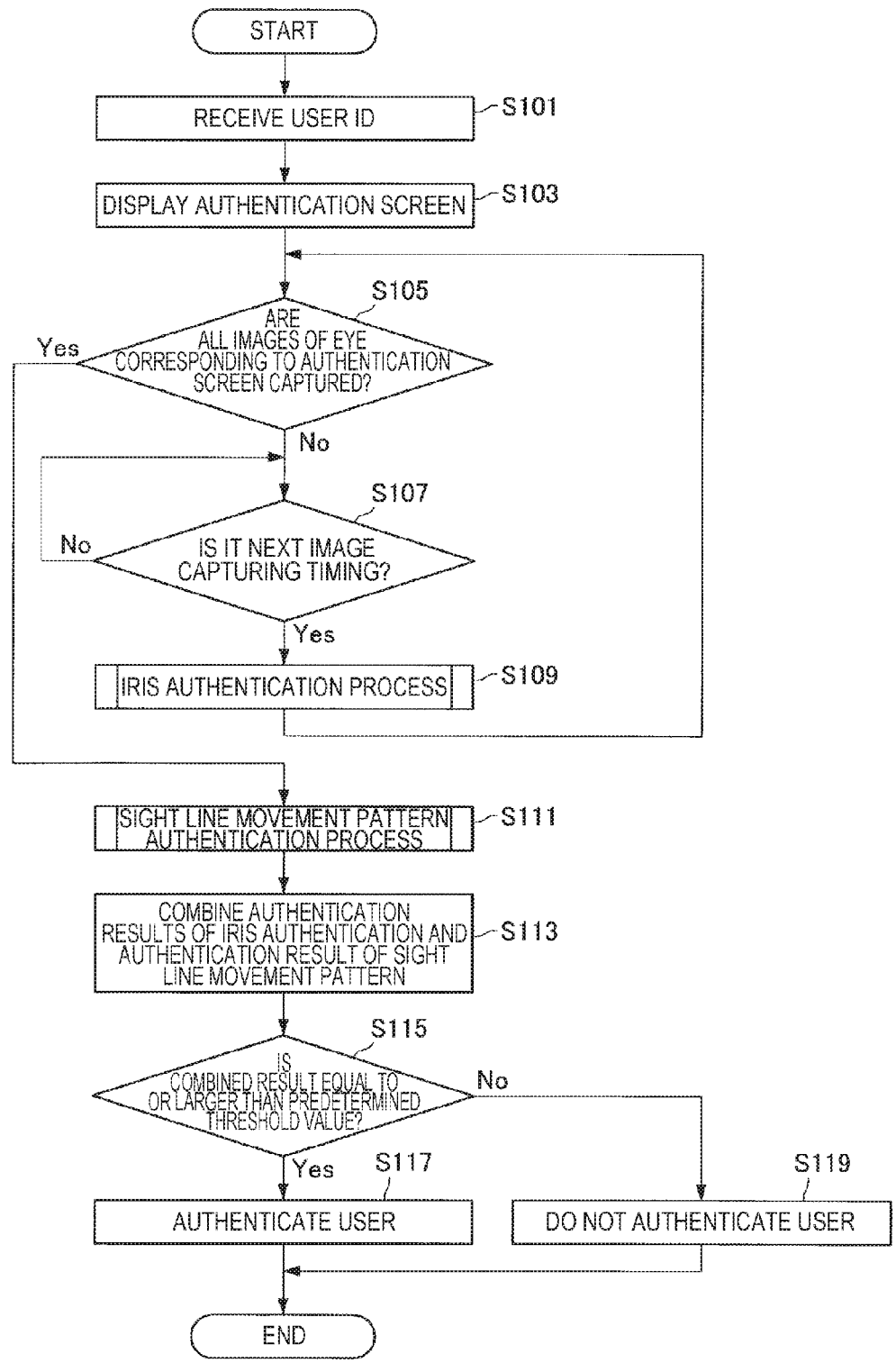
FIG. 12 is a flowchart that illustrates an operation according to this embodiment.

FIG. 12 is a flowchart that illustrates an operation according to the present embodiment. As illustrated in FIG. 12, first, the communication unit 120 of the information processing apparatus 10-1 receives the user ID from another device (S101).

Subsequently, the display control unit 118 causes the display unit 122 to display the authentication screen such as the pattern unlocking screen 32, for example (S103).

Subsequently, the image acquisition unit 104 confirms whether or not the captured images of the eye of the user have already been acquired, with regard to all the sight line directions associated with the displayed authentication screen (S105). If the image of the sight line direction that has not been acquired yet exists (S105: No), the image acquisition unit 104 determines whether or not the image capturing timing of the image of the next order is reached among the images that have not been acquired yet (S107). For example, in the pattern unlocking screen 32 illustrated in FIG. 7, when the sight line identification unit 102 recognizes that the user has moved the sight line to the direction corresponding to any one of a plurality of dots 320 adjacent to the dot 320 that is in an selected state at the present moment, the image acquisition unit 104 determines that the image capturing timing is reached.

If the image capturing timing has not been reached yet (S107: No), the image acquisition unit 104 repeats the operation of S107.

On the other hand, if the image capturing timing is reached (S107: Yes), the information processing apparatus 10-1 performs the later described "iris authentication process" (S109). Then, the image acquisition unit 104 repeats the operation of S105 again.

In S105, if the captured images of the eye relevant to all the sight line directions associated with the authentication screen have already been acquired (S105: Yes), the information processing apparatus 10-1 performs the later described "sight line movement pattern authentication process" (S111).

Subsequently, the authentication result combining unit 112 combines the authentication results of the iris authentication in S109 and the authentication result of the sight line movement pattern in S111 (S113).

Thereafter, the user authentication unit 116 determines whether or not the value of the result that is combined by S113 is equal to or larger than a predetermined threshold value (S115). If equal to or larger than the predetermined threshold value (S115: Yes), the user authentication unit 116 authenticates the relevant user (S117). On the other hand, if smaller than the predetermined threshold value (S115: No), the user authentication unit 116 does not authenticate the relevant user (S119).

[2-2-2. Iris Authentication Process]

Figure 13:
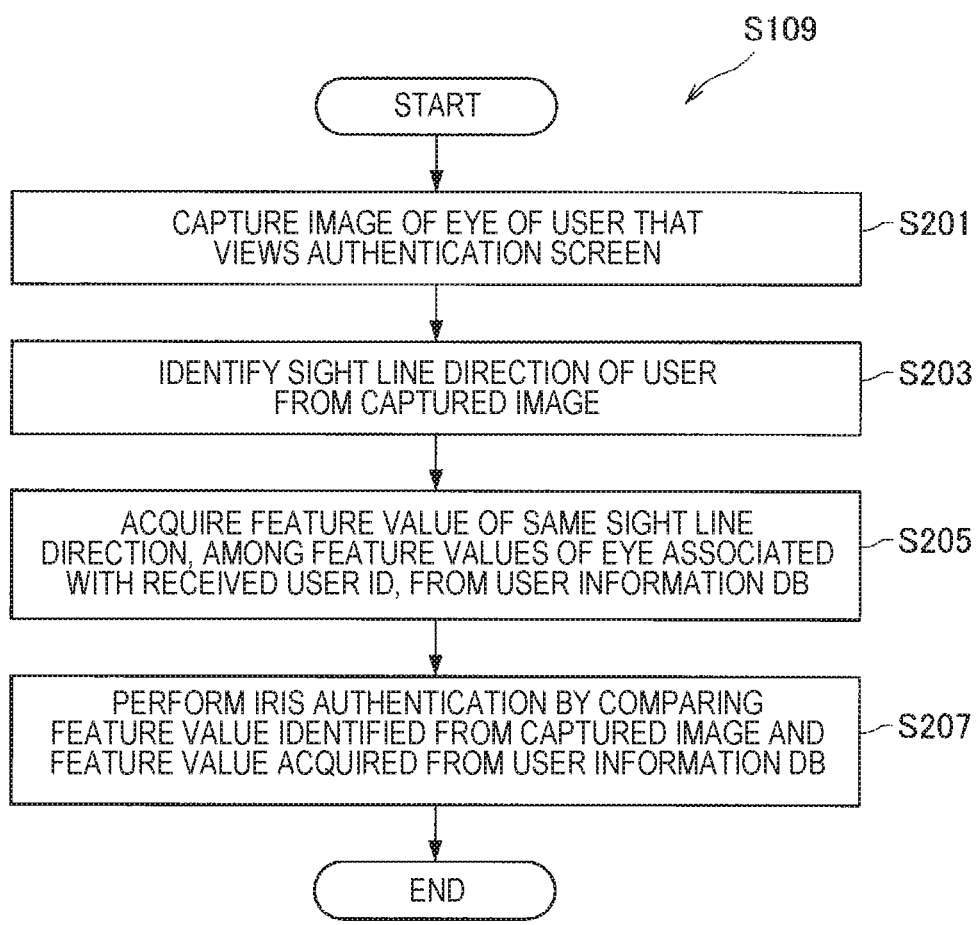
FIG. 13 is a flowchart that illustrates an operation of an iris authentication process according to this embodiment.

Next, a specific operation of "iris authentication process" in S109 will be described with reference to FIG. 13. As illustrated in FIG. 13, first, the image acquisition unit 104 acquires the captured image of the eye of the user which is captured after S107 by the imaging unit 124 (S201).

Subsequently, the sight line identification unit 102 identifies the sight line direction of the user in the captured image, on the basis of the captured image of the eye which is acquired by S201 (S203).

Subsequently, the iris authentication unit 106 acquires the feature value whose sight line direction is the same as the sight line direction identified in S203, among the feature values of the eye recorded in the user information DB 128 in association with the user ID received in S101, from the user information DB 128 (S205).

Thereafter, the iris authentication unit 106 performs the iris authentication by comparing the feature value identified from the captured image of the eye which is acquired in S201 and the feature value acquired in S205 (S207).

[2-2-3. Sight Line Movement Pattern Authentication Process]

Figure 14:
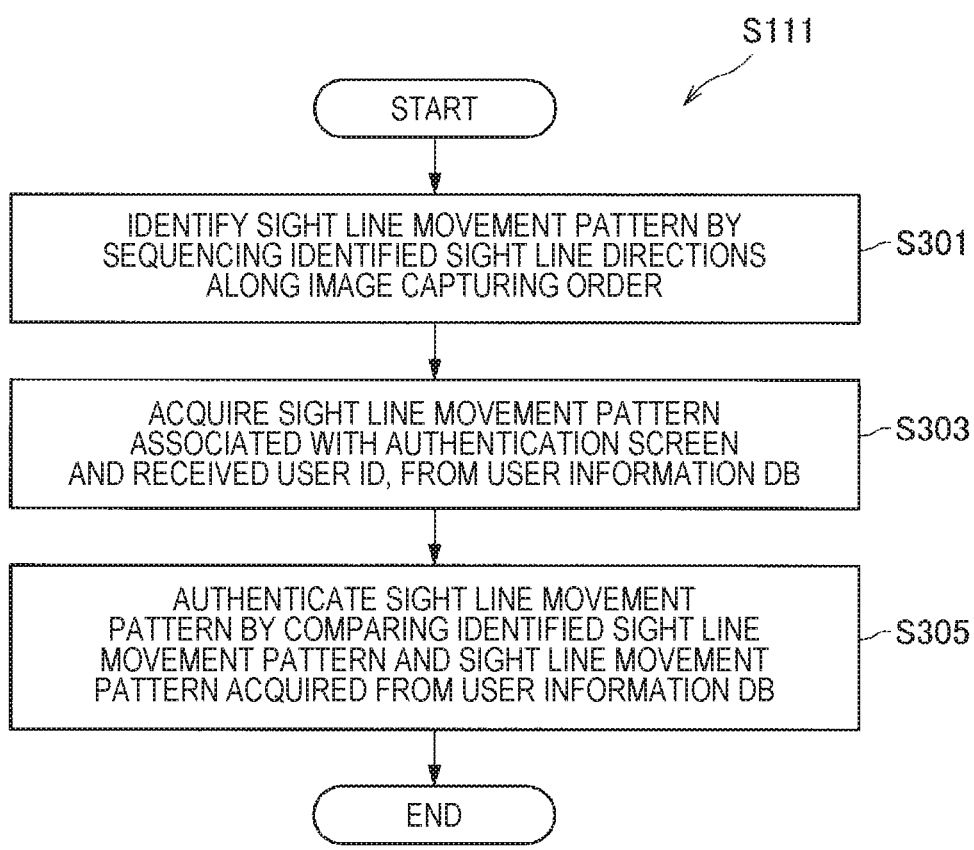
FIG. 14 is a flowchart that illustrates an operation of a sight line movement pattern authentication process according to this embodiment.

Next, the specific operation of "sight line movement pattern authentication process" in S111 will be described with reference to FIG. 14. As illustrated in FIG. 14, first, the sight line movement pattern identification unit 110 sequences the sight line directions identified in S203 along the image capturing order, and identifies the sequenced sight line directions as the sight line movement pattern (S301).

Subsequently, the sight line movement pattern authentication unit 108 acquires, from the user information DB 128, the sight line movement pattern recorded in the user information DB 128 in association with the authentication screen ID of the displayed authentication screen and the user ID received in S101 (S303).

Thereafter, the sight line movement pattern authentication unit 108 authenticates the validity of the sight line movement pattern identified in S301, by comparing the sight line movement pattern identified in S301 and the sight line movement pattern acquired in S303 (S305).

<2-3. Effect>

[2-3-1. Effect 1]

In the above, for example as described with reference to FIG. 2, FIGS. 12 to 14, etc., the information processing apparatus 10-1 according to the present embodiment performs the iris authentication on the basis of each of the plurality of captured images of the eye of different sight line directions of the user and the feature value of the eye of each sight line direction of the user which are recorded in the user information DB 128, and combines the authentication results of the iris authentication. Hence, highly robust authentication can be performed at a higher accuracy than the iris authentication that uses only one captured image, for example.

For example, the information processing apparatus 10-1 performs a plurality of iris authentications by using the captured images of a plurality of sight line directions, and combines the authentication results excluding the authentication result corresponding to the captured image that is determined to have a low image quality among the authentication results of the plurality of iris authentication.

In general, when the image quality of the iris imaged region is low, for example, when the iris imaged region and the region of outside light such as flare overlaps, the authentication accuracy decreases significantly, and there is a greater risk of failing in the iris authentication. However, the present embodiment excludes the authentication result of low reliability, and thus can maintain the authentication accuracy. Also, the user authentication can be performed at a high accuracy, without depending on the image capturing environment.

[2-3-2. Effect 2]

Also, the information processing apparatus 10-1 further combines the authentication result of the sight line movement pattern that is identified from the captured images of a plurality of sight line directions, with each of the authentication results of the iris authentication.

As described above, the authentication result of the iris authentication can vary, depending on the image quality of the captured image. On the other hand, the sight line movement pattern is usually identified uniquely, and thus the authentication result of the sight line movement pattern does not vary. Thus, the authentication accuracy can be improved, by combining the authentication result of the sight line movement pattern with the authentication result of the iris authentication.

For example, very high authentication accuracy is required in the authentication for executing a function for handling highly confidential information, such as a payment function. According to the present embodiment, high authentication accuracy that satisfies the above needs can be achieved, by using the result obtained by combining each of the authentication results of the iris authentication and the authentication result of the sight line movement pattern.

[2-3-3. Effect 3]

Also, if the image quality of the iris imaged region is low in all the captured images, the information processing apparatus 10-1 can authenticate the user by the authentication result of the sight line movement pattern. Hence, a situation in which a correct person is unable to be authenticated in an environment that is not suitable for the iris authentication can be prevented from occurring, for example.

3. Hardware Configuration

Figure 15:
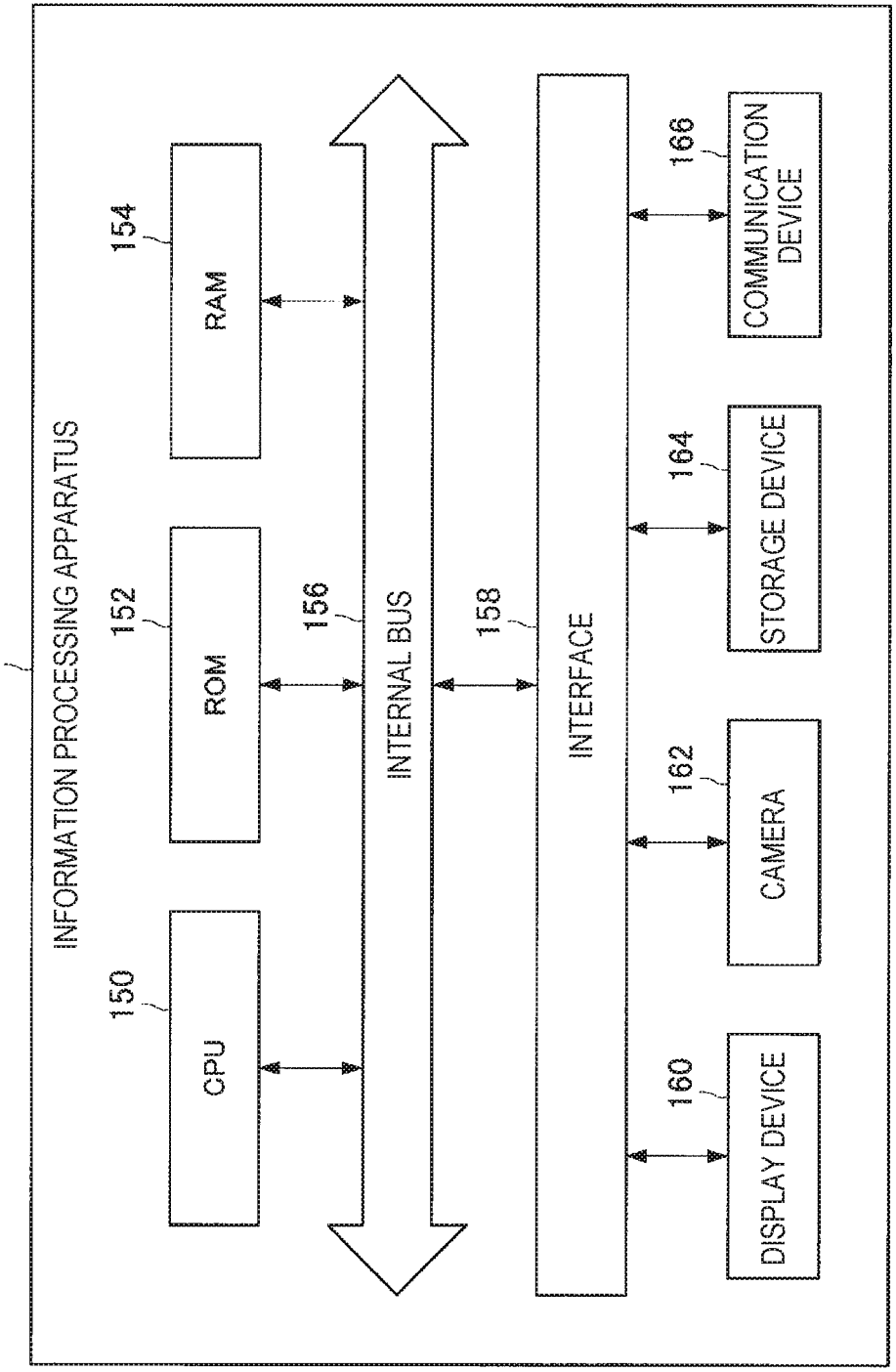
FIG. 15 is an explanatory diagram that illustrates a hardware configuration of an information processing apparatus 10-1 according to this embodiment.

Next, a hardware configuration of the information processing apparatus 10-1 according to the present embodiment will be described with reference to FIG. 15. As illustrated in FIG. 15, the information processing apparatus 10-1 includes a CPU 150, a read only memory (ROM) 152, a RAM 154, an internal bus 156, an interface 158, a display device 160, a camera 162, a storage device 164, and a communication device 166.

<3-1. CPU 150>

The CPU 150 functions as a computation processing device and a control device, and controls overall operation in the information processing apparatus 10-1 in accordance with various types of programs. Also, the CPU 150 provides the function of the control unit 100 in the information processing apparatus 10-1. Note that the CPU 150 is configured with a processor such as a microprocessor.

<3-2. ROM 152>

The ROM 152 stores programs and control data such as calculation parameters used by the CPU 150, etc.

<3-3. RAM 154>

The RAM 154 temporarily stores the programs or the like that are executed by the CPU 150, for example.

<3-4. Internal Bus 156>

The internal bus 156 is composed of a CPU bus and the like. This internal bus 156 connects the CPU 150, the ROM 152, and the RAM 154 to each other.

<3-5. Interface 158>

The interface 158 connects the display device 160, the camera 162, the storage device 164, and the communication device 166 to the internal bus 156. For example, the storage device 164 exchanges data with the CPU 150 via the interface 158 and the internal bus 156.

<3-6. Display Device 160>

The display device 160 includes a liquid crystal display (LCD) device, an organic light emitting diode (OLED) device, a lamp, or the like, for example. This display device 160 functions as the display unit 122.

<3-7. Camera 162>

The camera 162 has a function for capturing a still image or a moving image by forming an image of external scene on an image sensor such as a charge coupled device (CCD) and a complementary metal oxide semiconductor (CMOS) for example, through a lens. This camera 162 functions as the imaging unit 124.

<3-8. Storage Device 164>

The storage device 164 is a device for data storage which functions as the storage unit 126. The storage device 164 includes a storage medium, a record device that records data in the storage medium, a reading device that reads out data from the storage medium, a deleting device that deletes the data recorded in the storage medium, or the like, for example.

<3-9. Communication Device 166>

The communication device 166 is a communication interface that is composed of a communication device and the like for connecting to a communication network such as a public network and the Internet, for example. Also, the communication device 166 may be a wireless LAN compatible communication device, a long term evolution (LTE) compatible communication device, or a wire communication device that communicates via a wire. This communication device 166 functions as the communication unit 120.

4. Modification Examples

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

<4-1. First Exemplary Variant>

For example, FIG. 1 has illustrated an example in which the display unit 122 and the imaging unit 124 are provided in only one lens of the information processing apparatus 10-1, but the present disclosure is not limited to this example. The display unit 122 and the imaging unit 124 may be provided in both of the lenses of the information processing apparatus 10-1. Then, the information processing apparatus 10-1 may acquire the biometric information of both eyes and separately authenticate the biometric information of each eye.

In general, the biometric information of the right eye differs from the biometric information of the left eye. For example, the image of the iris of the right eye differs from the image of the iris of the left eye. According to this exemplary variant, the accuracy of the authentication can be further improved by combining the authentication results of the biometric information of the both eyes.

<4-2. Second Exemplary Variant>

[4-2-1. Car Navigation Device]

Also, in the above embodiment, an example in which the information processing apparatus according to the present disclosure is the eyeglass device has been described, but this example is not a limitation. For example, the information processing apparatus according to the present disclosure may be a car navigation device, like an information processing apparatus 10-2 illustrated in FIG. 16.

Figure 16:
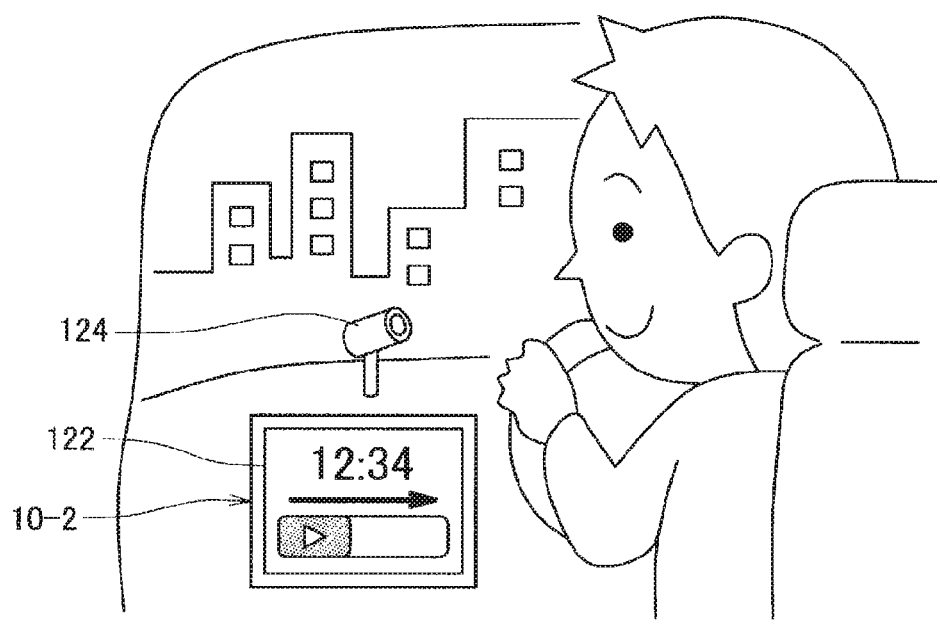
FIG. 16 is an explanatory diagram that illustrates an exemplary application of an exemplary variant of the present disclosure.

As illustrated in FIG. 16, the information processing apparatus 10-2 does not include the imaging unit 124, as compared with the information processing apparatus 10-1. Also, the imaging unit 124 according to this second exemplary variant is configured as an independent device. Then, the information processing apparatus 10-2 transmits various types of information to, and receives various types of information from, the imaging unit 124, by wired communication or wireless communication. For example, the information processing apparatus 10-2 receives the captured image of the eye of the user which is captured by the imaging unit 124, from the imaging unit 124.

According to this second exemplary variant, the user can perform the user authentication to the information processing apparatus 10-2, without wearing the information processing apparatus 10-2 on the body. For example, as illustrated in FIG. 16, the user remains seated on the driver's seat and performs input operation by the sight line to the display unit 122, in order to perform the user authentication.

[4-2-2. Others]

Also, the information processing apparatus according to the present disclosure is not limited to the above example, but may be a head mounted display (HMD), a personal computer (PC), a television receiver, an automatic locking device of a house, or the like, for example.

<4-3. Third Exemplary Variant>

Also, as another exemplary variant, the information processing apparatus 10-1 can also authorize the user to utilize different functions, depending on the authentication result after the combining by the authentication result combining unit 112. For example, the information processing apparatus 10-1 may authorize the user to utilize a function for using highly confidential information, as the authentication result after the combining is higher.

FIG. 17 is a table that lists examples of provided functions for each authentication result, according to the third exemplary variant. As illustrated in FIG. 17, the information processing apparatus 10-1 may authorize "terminal login" and "utilization of basic function application" for the user, when the authentication result after the combining is low, for example. Also, the information processing apparatus 10-1 may further authorize "utilization of payment function application" for the user, when the authentication result after the combining is a middle level. Also, the information processing apparatus 10-1 may further authorize "utilizing the information processing apparatus 10-1 as individual identification information (for example, like national ID)" for the user, when the authentication result after the combining is high. More specifically, in this case, the information processing apparatus 10-1 may change the status of the information processing apparatus 10-1 from "status that does not authorize presentation of individual identification information" to "status that authorizes presentation of individual identification information".

<4-4. Fourth Exemplary Variant>

Also, the above description has described an example in which the information processing apparatus 10-1 performs the authentication by using only one type of biometric information, such as the iris image for example, but this example is not a limitation, and the information processing apparatus 10-1 may perform the authentication by using a plurality of types of biometric information. For example, the information processing apparatus 10-1 may perform the authentication of the user by using the information (image) generated by combining two or more of the image of the iris, the image of the blood vessel pattern of the sclera, and the image of the retina. Alternatively, the information processing apparatus 10-1 may perform the authentication separately with regard to a plurality of types of biometric information.

<4-5. Fifth Exemplary Variant>

Also, although the above description has described an example in which the user authentication is performed under a premise that the user ID is received or input, that is, the user is identified, this example is not a limitation. For example, the information processing apparatus 10-1 can also identify which user the person of the image capturing target is, on the basis of the feature values of the eyes of all users recorded in the user information DB 128.

Specifically, the information processing apparatus 10-1 first performs the authentication by comparing each of the captured images of the eye of a plurality of sight line directions of the target person which are captured by the imaging unit 124, with the feature value of the same sight line direction as the captured image of the eye, among the feature values of the eyes of the respective users that belong to a specific group (or all users), which are recorded in the user information DB 128, respectively. Then, the information processing apparatus 10-1 can identify the user of the highest authentication result as the target person.

According to this fifth exemplary variant, when all family members are registered in advance as one group, the information processing apparatus 10-1 can identify who in the family the person of the image capturing target is, and can perform correct person authentication, even if the user ID is not input, for example.

<4-6. Sixth Exemplary Variant>

Note that, in the PIN code input screen 34 illustrated in FIG. 9, it is envisaged that transition of the sight line of the user is watched by a person that faces the user to steal a glance of the PIN code (indirectly), while the user is inputting the PIN code by the sight line. Thus, as an exemplary variant, the information processing apparatus 10-1 may perform control such that the eye of the user is unable to be watched from a front surface side of the lens when the user inputs the PIN code. For example, the information processing apparatus 10-1 may display a black screen only on the front surface of the lens, at the time of the above input. Alternatively, the information processing apparatus 10-1 may include an openable and closable lens cover on the front surface of the lens and automatically close the lens cover at the time of the above input.

Alternatively, as another exemplary variant, the information processing apparatus 10-1 may include a second camera directed toward the forward direction on the front surface of the lens, and the information processing apparatus 10-1 may perform control such that the eye of the user is unable to be watched from the front surface side of the lens, only when the above input is conducted and a person is detected in the forward direction of the user on the basis of the image captured by the second camera.

<4-7. Seventh Exemplary Variant>

Also, the present embodiment can provide a computer program for causing hardware such as the CPU 150, the ROM 152, and the RAM 154 to provide a function equivalent to each configuration of the above information processing apparatus 10-1. Also, a recording medium in which the computer program is recorded is provided.

Additionally, the present technology may also be configured as below.

(1)

An information processing apparatus including:

a biometric information authentication unit that authenticates biometric information identified from each of a plurality of captured images of an eye of a user of different sight line directions, on the basis of reference images of the eye of the user of the respective sight line directions; and an authentication result combining unit that combines authentication results by the biometric information authentication unit.

(2)

The information processing apparatus according to (1), further including:

a sight line movement pattern identification unit that identifies a movement pattern of a sight line of the user on the basis of the plurality of captured images of the eye; and a sight line movement pattern authentication unit that authenticates validity of the identified movement pattern of the sight line, on the basis of a registered sight line movement pattern registered in association with the user, wherein the authentication result combining unit combines the authentication results by the biometric information authentication unit and an authentication result by the sight line movement pattern authentication unit.

(3)

The information processing apparatus according to (2), wherein the sight line movement pattern identification unit identifies the movement pattern of the sight line of the user on the basis of sight line directions identified from the plurality of captured images of the eye.

(4)

The information processing apparatus according to (3), wherein the sight line movement pattern identification unit identifies a sequence, along an image capturing order, of the sight line directions identified from the plurality of captured images of the eye, as the movement pattern of the sight line of the user.

(5)

The information processing apparatus according to any one of (2) to (4), wherein the sight line movement pattern authentication unit authenticates the validity of the movement pattern of the sight line identified by the sight line movement pattern identification unit, on the basis of the registered sight line movement pattern registered further in association with a displayed authentication screen.

(6)

The information processing apparatus according to (5), wherein the plurality of captured images of the eye are a plurality of images captured when the user views the authentication screen.

(7)

The information processing apparatus according to any one of (2) to (6), wherein the authentication result combining unit combines, by linear combination, the authentication results by the biometric information authentication unit and the authentication result by the sight line movement pattern authentication unit.

(8)

The information processing apparatus according to any one of (1) to (7), further including:

an image quality determination unit that determines an image quality of an imaged region of the eye with regard to each of the plurality of captured images of the eye, wherein the authentication result combining unit combines authentication results other than an authentication result corresponding to a captured image that is determined to have a low image quality by the image quality determination unit, among a plurality of authentication results by the biometric information authentication unit.

(9)

The information processing apparatus according to any one of (1) to (8), wherein the biometric information authentication unit performs authentication of the biometric information, by comparing each of the plurality of captured images of the eye, with a reference image of the eye of the user which has the same sight line direction as the captured image of the eye.

(10)

The information processing apparatus according to (9), further including:

an acquisition unit that acquires identification information of the user, wherein the biometric information authentication unit authenticates the biometric information identified from each of the plurality of captured images of the eye, on the basis of reference images of the eye which are registered in association with the acquired identification information.

(11)

The information processing apparatus according to any one of (1) to (10), wherein the biometric information is an image of an iris.

(12)

The information processing apparatus according to any one of (1) to (11), further including:

a user authentication unit that authenticates the user by comparing a result combined by the authentication result combining unit and a predetermined threshold value.

(13)

The information processing apparatus according to any one of (1) to (12), further including:

a display unit that displays a display screen.

(14)

The information processing apparatus according to any one of (1) to (13), further including:

an imaging unit that captures an image of the eye of the user.

(15)

The information processing apparatus according to (13) or (14), wherein the information processing apparatus is a head-worn device.

(16)

An information processing method including:

authenticating biometric information identified from each of a plurality of captured images of an eye of a user of different sight line directions, on the basis of reference images of the eye of the user of the respective sight line directions; and combining authentication results of the biometric information.

(17)

A program for causing a computer to function as:

a biometric information authentication unit that authenticates biometric information identified from each of a plurality of captured images of an eye of a user of different sight line directions, on the basis of reference images of the eye of the user of the respective sight line directions; and an authentication result combining unit that combines authentication results by the biometric information authentication unit.

REFERENCE SIGNS LIST

10-1, 10-2 information processing apparatus
100 control unit
102 sight line identification unit
104 image acquisition unit
106 iris authentication unit
108 sight line movement pattern authentication unit
110 sight line movement pattern identification unit
112 authentication result combining unit
114 image quality determination unit
116 user authentication unit
118 display control unit
120 communication unit
122 display unit
124 imaging unit
126 storage unit
128 user information DB

The invention claimed is:

1. An information processing apparatus, comprising:
a biometric information authentication unit configured to authenticate biometric information identified from each of a plurality of captured images of an eye of a user of different sight line directions, based on reference images of the eye of the user of a respective sight line directions;

an authentication result combining unit configured to combine authentication results by the biometric information authentication unit;

a sight line movement pattern identification unit configured to identify a movement pattern of a sight line of the user based on the plurality of captured images of the eye.

2. The information processing apparatus according to claim 1, further comprising:

a sight line movement pattern authentication unit configured to authenticate validity of the identified movement pattern of the sight line, based on a registered sight line movement pattern registered in association with the user, wherein the authentication result combining unit is further configured to combine the authentication results by the biometric information authentication unit and an authentication result by the sight line movement pattern authentication unit.

3. The information processing apparatus according to claim 1, wherein the sight line movement pattern identification unit is further configured to identify the movement pattern of the sight line of the user based on sight line directions identified from the plurality of captured images of the eye.

4. The information processing apparatus according to claim 3, wherein the sight line movement pattern identification unit is further configured to identify a sequence, along an image capturing order, of the sight line directions identified from the plurality of captured images of the eye, as the movement pattern of the sight line of the user.

5. The information processing apparatus according to claim 2, wherein the sight line movement pattern authentication unit is further configured to authenticate the validity of the movement pattern of the sight line identified by the sight line movement pattern identification unit, based on the registered sight line movement pattern registered further in association with a displayed authentication screen.

6. The information processing apparatus according to claim 5, wherein the plurality of captured images of the eye are a plurality of images captured based on the user that views the displayed authentication screen.

7. The information processing apparatus according to claim 2, wherein the authentication result combining unit is further configured to combine, by linear combination, the authentication results by the biometric information authentication unit and the authentication result by the sight line movement pattern authentication unit.

8. The information processing apparatus according to claim 1, further comprising:

an image quality determination unit is configured to determine an image quality of an imaged region of the eye with regard to each of the plurality of captured images of the eye, wherein the authentication result combining unit is further configured to combine authentication results other than an authentication result corresponding to a captured image that is determined to have a low image quality by the image quality determination unit, among a plurality of authentication results by the biometric information authentication unit.

9. The information processing apparatus according to claim 1, wherein the biometric information authentication unit is further configured to authenticate the biometric information, based on comparison of each of the plurality of captured images of the eye, with a reference image of the eye of the user which has same sight line direction as the plurality of captured images of the eye.

10. The information processing apparatus according to claim 9, further comprising:

an acquisition unit is configured to acquire identification information of the user, wherein the biometric information authentication unit is further configured to authenticate the biometric information identified from each of the plurality of captured images of the eye, based on of reference images of the eye which are registered in association with the acquired identification information.

11. The information processing apparatus according to claim 1, wherein the biometric information is an image of an iris.

12. The information processing apparatus according to claim 1, further comprising:

a user authentication unit is configured to authenticate the user based on comparison of a result combined by the authentication result combining unit and a threshold value.

13. The information processing apparatus according to claim 1, further comprising:

a display unit configured to display a display screen.

14. The information processing apparatus according to claim 1, further comprising:

an imaging unit configured to capture an image of the eye of the user.

15. The information processing apparatus according to claim 13, wherein the information processing apparatus is a head-worn device.

16. An information processing method, comprising:

authenticating biometric information identified from each of a plurality of captured images of an eye of a user of different sight line directions, based on reference images of the eye of the user of a respective sight line directions;

combining authentication results of the biometric information; and identifying a movement pattern of a sight line of the user based on the plurality of captured images of the eye.

17. A non-transitory computer-readable medium having stored thereon, computer-executable instructions, which when executed by a computer, cause the computer to control an information processing apparatus to execute operations, the operations comprising:

authenticating biometric information identified from each of a plurality of captured images of an eye of a user of different sight line directions, based on reference images of the eye of the user of a respective sight line directions;

combining authentication results by the biometric information; and identifying a movement pattern of a sight line of the user based on the plurality of captured images of the eye.

* * * * *